United States Patent
Pezzimenti et al.

(10) Patent No.: US 10,362,820 B2
(45) Date of Patent: Jul. 30, 2019

(54) COLD WEATHER VENTED GARMENT

(71) Applicant: NIKE, Inc., Beaverton, OR (US)

(72) Inventors: Luke A. Pezzimenti, Portland, OR (US); Lindsey V. J. Martin, Portland, OR (US); Irena Ilcheva, Beaverton, OR (US)

(73) Assignee: NIKE, Inc., Beaverton, OR (US)

( * ) Notice: Subject to any disclaimer, the term of this patent is extended or adjusted under 35 U.S.C. 154(b) by 198 days.

(21) Appl. No.: 15/140,214

(22) Filed: Apr. 27, 2016

(65) Prior Publication Data
US 2016/0235147 A1    Aug. 18, 2016

Related U.S. Application Data

(63) Continuation of application No. 13/449,783, filed on Apr. 18, 2012, now Pat. No. 9,392,825.

(51) Int. Cl.
*A41D 27/28* (2006.01)
*A41D 27/24* (2006.01)
(Continued)

(52) U.S. Cl.
CPC .............. *A41D 27/28* (2013.01); *A41D 1/04* (2013.01); *A41D 3/00* (2013.01); *A41D 3/02* (2013.01); *A41D 13/002* (2013.01); *A41D 13/0015* (2013.01); *A41D 15/002* (2013.01); *A41D 27/04* (2013.01); *A41D 27/24* (2013.01); *A41D 27/245* (2013.01); *A41D 31/065* (2019.02); *A41D 31/102* (2019.02); *A41D 31/14* (2019.02); *B29C 65/02* (2013.01); *B29C 65/4835* (2013.01); *B29C 65/5057* (2013.01); *B29C 65/62* (2013.01); *B29C 65/72* (2013.01);
(Continued)

(58) Field of Classification Search
CPC . A41D 27/28; A41D 3/02; A41D 3/04; A41D 13/0015; A41D 13/002; A41D 27/245; B29C 65/72
USPC ............................................................. 2/69
See application file for complete search history.

(56) References Cited

U.S. PATENT DOCUMENTS

| 317,711 A | 5/1885 | Beinkmanf |
| 385,306 A | 6/1888 | Helwitz |

(Continued)

FOREIGN PATENT DOCUMENTS

| CN | 1864574 A | 11/2006 |
| CN | 2927724 A | 8/2007 |

(Continued)

OTHER PUBLICATIONS

Notice of Allowance dated May 20, 2016 in U.S. Appl. No. 13/449,783, 10 pages.

(Continued)

*Primary Examiner* — Alissa L Hoey
(74) *Attorney, Agent, or Firm* — Shook, Hardy and Bacon LLP

(57) ABSTRACT

The present invention relates to breathable, vented, and insulating cold weather garments. More particularly, the present invention relates to garments with chambers to retain an insulating fill material. Perforations along the seams between the insulating chambers may achieve optimal evaporative moisture transfer from the inside (proximal to the body of a wearer) of the garment to the outside environment.

5 Claims, 7 Drawing Sheets

(51) Int. Cl.

| | | |
|---|---|---|
| *A41D 3/02* | (2006.01) | |
| *A41D 13/002* | (2006.01) | |
| *B29C 65/00* | (2006.01) | |
| *B29C 65/50* | (2006.01) | |
| *B29C 65/02* | (2006.01) | |
| *B29C 65/62* | (2006.01) | |
| *A41D 1/04* | (2006.01) | |
| *A41D 3/00* | (2006.01) | |
| *A41D 13/00* | (2006.01) | |
| *A41D 27/04* | (2006.01) | |
| *B29C 65/72* | (2006.01) | |
| *B29D 99/00* | (2010.01) | |
| *A41D 15/00* | (2006.01) | |
| *B29C 65/48* | (2006.01) | |
| *A41D 31/06* | (2019.01) | |
| *A41D 31/14* | (2019.01) | |
| *A41D 31/102* | (2019.01) | |
| *B29L 31/48* | (2006.01) | |
| *B29C 65/08* | (2006.01) | |
| *B29C 65/74* | (2006.01) | |

(52) U.S. Cl.
CPC ...... *B29C 66/0326* (2013.01); *B29C 66/1122* (2013.01); *B29C 66/433* (2013.01); *B29C 66/436* (2013.01); *B29C 66/729* (2013.01); *B29D 99/0064* (2013.01); *A41D 2300/52* (2013.01); *A41D 2400/10* (2013.01); *A41D 2500/10* (2013.01); *B29C 65/08* (2013.01); *B29C 65/7437* (2013.01); *B29C 66/0346* (2013.01); *B29C 66/8322* (2013.01); *B29C 2793/0045* (2013.01); *B29K 2913/00* (2013.01); *B29L 2031/485* (2013.01)

(56) References Cited

U.S. PATENT DOCUMENTS

| | | | |
|---|---|---|---|
| 1,252,187 | A | 1/1918 | Shane |
| 1,252,188 | A | 1/1918 | Shane |
| 1,612,010 | A | 12/1926 | Gray |
| 1,788,731 | A | 1/1931 | Mishel |
| 2,084,173 | A | 6/1937 | Wexler |
| 2,121,836 | A | 6/1938 | Steinberger et al. |
| 2,353,984 | A | 7/1944 | Barone |
| 2,372,632 | A | 3/1945 | Webb et al. |
| 2,385,124 | A | 9/1945 | Barone |
| 2,464,380 | A | 3/1949 | Daiber |
| 2,466,911 | A | 4/1949 | Raymond |
| 2,851,390 | A | 9/1958 | Chavannes |
| 3,115,564 | A | 12/1963 | Stacy |
| 3,405,674 | A | 10/1968 | Coates et al. |
| 3,562,041 | A | 2/1971 | Robertson |
| 3,706,102 | A | 12/1972 | Grenier |
| 3,761,962 | A | 10/1973 | Myers |
| 3,771,170 | A | 11/1973 | Leon |
| 3,819,465 | A | 6/1974 | Parsons et al. |
| 3,852,144 | A | 12/1974 | Parry |
| 4,048,675 | A | 9/1977 | Griffin |
| 4,115,610 | A | 9/1978 | Wortman |
| 4,181,993 | A * | 1/1980 | McDaniel ............... B63C 9/125 441/108 |
| 4,185,327 | A | 1/1980 | Markve |
| 4,311,542 | A | 1/1982 | Mueller et al. |
| 4,370,754 | A * | 2/1983 | Donzis ............... A41D 13/0153 2/16 |
| 4,396,039 | A | 8/1983 | Klenk et al. |
| 4,471,759 | A | 9/1984 | Anderson et al. |
| 4,496,407 | A | 1/1985 | Lowery, Sr. et al. |
| 4,502,153 | A | 3/1985 | Lapedes |
| 4,560,427 | A | 12/1985 | Flood |
| 4,604,152 | A | 8/1986 | Liukko |
| 4,608,715 | A | 9/1986 | Miller et al. |
| 4,610,750 | A | 9/1986 | Mango |
| 4,625,336 | A | 12/1986 | Derderian |
| 4,693,771 | A | 9/1987 | Payet et al. |
| 4,713,131 | A | 12/1987 | Obeda |
| 4,716,598 | A | 1/1988 | Bertram |
| 4,737,212 | A | 4/1988 | Emrich et al. |
| 4,788,972 | A | 12/1988 | Debusk |
| 4,791,685 | A | 12/1988 | Maibauer |
| 4,938,817 | A | 7/1990 | Langley |
| 4,962,554 | A | 10/1990 | Tesch |
| 4,971,071 | A | 11/1990 | Millikan et al. |
| 5,001,783 | A | 3/1991 | Grilliot et al. |
| 5,003,902 | A | 4/1991 | Benstock et al. |
| 5,048,126 | A | 9/1991 | McLaughlin |
| 5,067,178 | A | 11/1991 | Katchka et al. |
| 5,131,097 | A | 7/1992 | Grilliot et al. |
| 5,165,115 | A | 11/1992 | Stanislaw et al. |
| 5,168,576 | A | 12/1992 | Krent et al. |
| 5,255,392 | A | 10/1993 | Stanislaw et al. |
| 5,267,519 | A | 12/1993 | Uglene et al. |
| 5,408,700 | A | 4/1995 | Reuben et al. |
| 5,445,863 | A | 8/1995 | Slagle et al. |
| 5,446,927 | A | 9/1995 | Weldon |
| 5,483,713 | A | 1/1996 | Kikuchi et al. |
| 5,526,534 | A | 6/1996 | Lazar |
| 5,665,196 | A | 9/1997 | Combe et al. |
| 5,692,245 | A | 12/1997 | Reuben |
| 5,713,079 | A | 2/1998 | Simon et al. |
| 5,787,502 | A | 8/1998 | Middleton |
| 5,799,600 | A | 9/1998 | Reuben |
| 5,885,679 | A | 3/1999 | Yasue et al. |
| 5,924,134 | A | 7/1999 | Taylor et al. |
| 5,935,878 | A | 8/1999 | Glasser |
| 6,009,560 | A | 1/2000 | McKenney et al. |
| 6,018,819 | A | 2/2000 | King et al. |
| 6,038,700 | A | 3/2000 | Aldridge et al. |
| 6,049,908 | A | 4/2000 | Bullock et al. |
| 6,076,196 | A | 6/2000 | Masumoto |
| 6,182,297 | B1 | 2/2001 | Duren et al. |
| 6,279,161 | B1 | 8/2001 | Johnston |
| 6,339,843 | B1 | 1/2002 | Grilliot et al. |
| 6,547,327 | B1 | 4/2003 | Yates |
| 6,579,403 | B2 | 6/2003 | Tolbert et al. |
| 6,649,251 | B1 | 11/2003 | Gruecke et al. |
| 6,805,181 | B2 | 10/2004 | Blundell et al. |
| 6,817,037 | B1 | 11/2004 | King |
| 6,928,665 | B1 | 8/2005 | Yates |
| 7,005,021 | B2 | 2/2006 | Kramer |
| 7,051,373 | B1 | 5/2006 | Krall |
| 7,094,714 | B2 | 8/2006 | Lap et al. |
| 7,111,328 | B2 | 9/2006 | Bay |
| 7,140,048 | B2 | 11/2006 | Wallerstein |
| 7,578,005 | B2 | 8/2009 | Vereen |
| 7,757,311 | B2 | 7/2010 | Garneau |
| 7,827,624 | B1 | 11/2010 | Cole |
| 7,926,124 | B2 | 4/2011 | Hunter et al. |
| 8,028,386 | B2 | 10/2011 | Rock et al. |
| 8,057,878 | B2 | 11/2011 | Lo et al. |
| 8,070,905 | B2 | 12/2011 | Brennan |
| 8,127,701 | B2 | 3/2012 | Harward |
| 8,133,824 | B2 | 3/2012 | Harber |
| 8,377,536 | B2 | 2/2013 | Cienski |
| 8,399,085 | B2 | 3/2013 | Moore, III et al. |
| 8,458,819 | B1 | 6/2013 | Hoole |
| 8,518,511 | B2 | 8/2013 | Harward |
| D693,095 | S | 11/2013 | Grant |
| 8,578,516 | B2 | 11/2013 | Li |
| 8,756,714 | B2 | 6/2014 | Reimer |
| D713,620 | S | 9/2014 | Pezzimenti et al. |
| D713,621 | S | 9/2014 | Pezzimenti et al. |
| D714,022 | S | 9/2014 | Mong et al. |
| 8,828,167 | B2 | 9/2014 | Hannon |
| 8,840,745 | B2 | 9/2014 | Green |
| 9,023,161 | B2 | 5/2015 | Ma et al. |
| 9,138,060 | B2 | 9/2015 | Vainberg et al. |
| 9,247,830 | B2 | 2/2016 | Waters et al. |
| 9,392,825 | B2 | 7/2016 | Pezzimenti et al. |
| 10,111,480 | B2 | 10/2018 | Pezzimenti |
| 2003/0033656 | A1 | 2/2003 | Jaeger |

(56) References Cited

U.S. PATENT DOCUMENTS

| | | |
|---|---|---|
| 2003/0126673 A1 | 7/2003 | Yardley |
| 2003/0138586 A1 | 7/2003 | Fowler |
| 2003/0208831 A1 | 11/2003 | Lazar et al. |
| 2004/0083538 A1 | 5/2004 | Thomas |
| 2004/0111782 A1 | 6/2004 | Lenormand et al. |
| 2005/0124256 A1 | 6/2005 | Mason et al. |
| 2005/0249917 A1 | 11/2005 | Trentacosta et al. |
| 2006/0059601 A1 | 3/2006 | Opitz et al. |
| 2006/0165939 A1 | 7/2006 | Hottner |
| 2006/0185053 A1 | 8/2006 | Wittmann et al. |
| 2006/0240234 A1 | 10/2006 | O'Neill et al. |
| 2007/0026186 A1 | 2/2007 | Chapuis |
| 2007/0083985 A1 | 4/2007 | Nathan et al. |
| 2007/0245448 A1 | 10/2007 | Bury |
| 2007/0294800 A1 | 12/2007 | Huang |
| 2008/0005823 A1 | 1/2008 | Hung |
| 2008/0127395 A1 | 6/2008 | Blauer |
| 2008/0295216 A1 | 12/2008 | Nordstrom et al. |
| 2009/0089911 A1 | 4/2009 | Smith |
| 2009/0155543 A1 | 6/2009 | Fowler |
| 2009/0233042 A1 | 9/2009 | Sadato et al. |
| 2009/0314696 A1 | 12/2009 | Trentacosta et al. |
| 2010/0138977 A1 | 6/2010 | Lin |
| 2010/0143669 A1 | 6/2010 | Abrams |
| 2010/0281595 A1 | 11/2010 | Gernes |
| 2010/0287680 A1 | 11/2010 | Johnson et al. |
| 2010/0291825 A1 | 11/2010 | Johnson et al. |
| 2011/0119811 A1 | 5/2011 | Rock et al. |
| 2011/0125125 A1 | 5/2011 | Schneider et al. |
| 2011/0296580 A1 | 12/2011 | Demarest et al. |
| 2012/0005829 A1 | 1/2012 | Waters et al. |
| 2012/0005831 A1 | 1/2012 | Waters et al. |
| 2012/0114883 A1 | 5/2012 | Kapur et al. |
| 2012/0222189 A1 | 9/2012 | Sokolowski et al. |
| 2012/0328824 A1 | 12/2012 | Cartabbia |
| 2013/0014317 A1 | 1/2013 | Ly |
| 2013/0038104 A1 | 2/2013 | Burns et al. |
| 2013/0061366 A1 | 3/2013 | Pezzimenti |
| 2013/0177731 A1 | 7/2013 | Moriarty |
| 2013/0255103 A1 | 10/2013 | Dua et al. |
| 2013/0276201 A1 | 10/2013 | Pezzimenti |
| 2013/0277349 A1 | 10/2013 | Pezzimenti |
| 2014/0304896 A1 | 10/2014 | Nordstrom et al. |
| 2014/0349057 A1 | 11/2014 | Blackford et al. |
| 2015/0044943 A1 | 2/2015 | Marshall et al. |
| 2016/0183613 A1 | 6/2016 | Martin |
| 2016/0213077 A1 | 7/2016 | Sung |
| 2016/0278459 A1 | 9/2016 | Hilty |
| 2016/0366962 A1 | 12/2016 | Ilcheva et al. |
| 2016/0366963 A1 | 12/2016 | Koshkaroff et al. |
| 2017/0028669 A1 | 2/2017 | Regester et al. |
| 2017/0065005 A1 | 3/2017 | Nordstrom |
| 2017/0099899 A1 | 4/2017 | Pezzimenti et al. |
| 2017/0245560 A1 | 8/2017 | Pezzimenti et al. |

FOREIGN PATENT DOCUMENTS

| | | |
|---|---|---|
| CN | 2927724 Y | 8/2007 |
| CN | 201782000 U | 4/2011 |
| EP | 1325976 A1 | 7/2003 |
| EP | 2617306 A1 | 7/2013 |
| JP | 2005226173 A | 8/2005 |
| KR | 20090113413 A | 11/2009 |
| WO | 2003057975 A1 | 7/2003 |
| WO | 2004082413 A1 | 9/2004 |
| WO | 2013070086 A1 | 5/2013 |
| WO | 2014062067 A1 | 4/2014 |
| WO | 2014087161 A1 | 6/2014 |

OTHER PUBLICATIONS

International Search Report and Written Opinion dated Dec. 20, 2016 in International Patent Application No. PCT/US2016/054798, 11 pages.

Non-Final Office Action dated Mar. 20, 2017 in U.S. Appl. No. 15/391,187, 14 pages.

Final Office Action dated Jun. 1, 2017 in U.S. Appl. No. 15/391,187, 11 pages.

Non-Final Office Action dated Oct. 6, 2017 in U.S. Appl. No. 15/391,187, 12 pages.

International Search Report and Written Opinion dated Dec. 20, 2017 in International Patent Application No. PCT/US2017/055095, 13 pages.

International Search Report and Written Opinion dated Dec. 18, 2017 in International Patent Application No. PCT/US2017/049833, 14 pages.

International Search Report and Written Opinion dated Dec. 18, 2017 in International Patent Application No. PCT/US2017/049840, 13 pages.

International Search Report and Written Opinion dated Dec. 20, 2017 in International Patent Application No. PCT/US2017/055094, 14 pages.

International Search Report and Written Opinion dated Dec. 20, 2017 in International Patent Application No. PCT/US2017/055308, 14 pages.

Final Office Action dated Feb. 22, 2018 in U.S. Appl. No. 15/391,187, 13 pages.

Notice of Allowance dated Mar. 5, 2018 in U.S. Appl. No. 14/877,199, 5 pages.

Non-Final Office Action dated Jun. 30, 2017 in U.S. Appl. No. 14/877,199, 8 pages.

European Search Report dated Nov. 18, 2016 in European Patent Application No. 16179320.3, 8 pages.

Nike Aeroloft, Nike. Last accessed Jan. 23, 2015 at: http://www.nike.com/us/en_us/c/running/aeroloft.

78678 North End Sport Pursuit 3-Layer Hybrid Soft Shell Jacket with Laser Perforation, Seasons Outfitters, seasonsoutfitters.com; Last accessed Jan. 23, 2015 at: http://www.seasonsoutfitters.com/index.php/outerwear-32/waterproof/78678-pursuitladies-3-layer-light-bonded-hybrid-soft-shell-jacket-with-laser-perforation.html.

"Mavis Helium Jacket (Men's)," MEC, mec.ca Last accessed Jan. 23, 2015 at: http://www.mec.ca/product/5038-526/mavic-helium-jacket-mens/.

Salomon Men's S-Lab Hybrid Jacket, Running Warehouse, runningwarehouse.com. Last accessed Jan. 23, 2015 at: http://www.runningwarehouse.com/Salomon_Mens_S-Lab_Hybrid_Jacket/descpage-SMSLHJ.html.

"Women's Better than Naked™ Cool Jacket," The North Face®, thenorthface.com Last accessed Jan. 23, 2015 at: http://www.thenorthface.com/Gatalog/sc-gear/women-39-s-better-than-nakedcool-jacket.html.

88680: Ventilate—Men's Seam-Sealed Insulated Jacket, Alphabroder, ashcity.com Last accessed Jan. 23, 2015 at: http://www.ashcity.com/en-ca/products/outerwear/insulated-seam-sealed/88680-ventilate-mens-nbsp-3bseam-sealed-insulated-jacket.html.

W's C9 Loft Jacket, Houdini, houdinisportswear.com Last accessed Jan. 23, 2015 at: http://www.houdinisportswear.com/en/women/womens-c9-loft-jacket.

"Laser Perforated Jacket," Akris punto, Nordstrom, Item # 251033. Last accessed Jan. 23, 2015 at: http://shop.nordstrom.com/s/akris-punto-laser-perforated-jacket/3667112.

"Greenland Baffled Jacket," Marmot® for Life, marmot.com, #5067. Last accessed Jan. 23, 2015 at: http://marmot.com/products/details/greenland-baffled-jacket.

"Woman's Aconcagua Jacket," The North Face, thenorthface.com. Last accessed Jan. 23, 2015 at: http://www.thenorthface.com/catalog/sc-gear/womens-jackets-vests/women-8217-saconcagua-jacket.html.

Rab Microlight Alpine Down Jacket, backcountry.com, Item # RAB0244. Last accessed Jan. 23, 2015 at: http://www.backcountry.com/rab-microlight-alpine-down-jacketwomens?CMP_SKU=RAB0244&MER=0406&skid=RAB0244-ORC-USXLUS16.

Women's Old Navy Active Front-Quilted Jackets, Old Navy oldnavy.gap.com Last accessed Jan. 23, 2015 at: http://oldnavy.gap.com/browse/product.do?vid=1&pid=172238002.

(56) References Cited

OTHER PUBLICATIONS

"Quilted Front Down Sweater Jacket," Moncler, Nordstrom, Item #803724. Last accessed Jan. 23, 2015 at: http://shop.nordstrom.com/s/moncler-quilted-front-down-sweater-jacket/3900159.

"Pizzoli' Knit & Quilted Jacket," Boss Hugo Boss, Nordstrom, Item #73989. Last accessed Jan. 23, 2015 at: http://shop.nordstrom.com/s/boss-hugo-boss-pizzoli-knit-quilted-jacket/3782194.

"Barbour Mens Chukka Quilted Jacket Military Brown Navy," Barbour, coveredbridgecyclery.com Last accessed Jan. 23, 2015 at: http://www.coveredbridgecyclery.com/barbour-mens-chukka-quilted-jacket-militarybrown-navy-1423.html.

Angel, "Trend: Quilted Textures," youlookfab.com, Jul. 15, 2013. Last accessed Jan. 23, 2015 at: http://youlookfab.com/2013/07/15/trend-quilted-textures/.

Bendzovski, Daniel, "Trend-sandwich: Exploring new ways of joining inspiration, such as different kinds of trends, through processes of morphing and melding different trendy garments and materials, for new methods, garment types, materials and expressions,"Univ. of Borås, 2015. http://www.diva-portal.org/smash/get/diva2:825758/FULLTEXT01.pdf.

European Extended Search Report dated Nov. 22, 2015 in Application No. 13778175.3, 6 pages.

International Search Report and Written Opinion dated Jul. 25, 2013 for PCT/US2013/037187 filed Apr. 18, 2013.

International Preliminary Report on Patentability dated Apr. 19, 2018 in International Patent Application No. PCT/US2016/055626, 8 pages.

Non-Final Office Action dated Jun. 5, 2018 in U.S. Appl. No. 15/286,929, 12 pages.

Non-Final Office Action dated Jun. 21, 2018 in U.S. Appl. No. 15/391,187, 13 pages.

Non-Final Office Action dated Jul. 3, 2018 in U.S. Appl. No. 15/255,603, 8 pages.

Non-Final Office Action dated Jul. 31, 2018 in U.S. Appl. No. 15/254,749, 8 pages.

Final Office Action dated Oct. 9, 2018 in U.S. Appl. No. 15/286,929, 13 pages.

Office Action dated Jul. 18, 2018 in European Patent Application No. 16179320.3, 4 pages.

International Search Report and Written Opinion dated Sep. 3, 2018 in International Patent Application No. PCT/US2018/033094, 13 pages.

Non-Final Office Action dated Nov. 16, 2018 in U.S. Appl. No. 15/286,913, 13 pages.

Non-Final Office Action dated Nov. 20, 2018 in U.S. Appl. No. 15/255,601, 16 pages.

\* cited by examiner

COLD WEATHER VENTED GARMENT

CROSS-REFERENCE TO RELATED APPLICATIONS

This application is a Continuation of pending U.S. application Ser. No. 13/449,783, filed Apr. 18, 2012, and entitled "Cold Weather Vented Garment," which is herein incorporated by reference in its entirety.

STATEMENT REGARDING FEDERALLY SPONSORED RESEARCH OR DEVELOPMENT

Not applicable.

TECHNICAL FIELD

The present invention relates to cold weather insulation garments. More particularly, the present invention relates to breathable insulating cold weather garments suitable for short term vigorous aerobic activity such as for example a run, a bike ride, a short hike around the neighborhood, etc.

BACKGROUND OF THE INVENTION

With the desire to stay active year round, there is a need for breathable insulating garments for use during physical activity in the cold weather months. Conventional cold weather garments may not allow for moisture from perspiration to escape from the inside of the garment. The trapping of moisture from perspiration may be particularly problematic for garments constructed from inherently water resistant fabrics. Often, garments with fill material such as down or fibers are constructed of textiles that are resistant to the fill material penetrating the textile, either partially or entirely. Such fill proof textiles may be created using treatments such as a durable water repellant (DWR) or by weaving or knitting a textile of sufficient weight to retain the fill material. These approaches often render the textile water resistant, however. Therefore, these garments may trap moisture inside of the garments, which may then lead to discomfort for the wearer, and eventually may become counterproductive as cold weather insulating garments.

BRIEF SUMMARY OF THE INVENTION

The present invention generally relates to a cold weather garment capable of providing insulation and breathability, thereby overcoming the problem of moisture release from the inside of a cold weather garment in conventional garments. The cold weather vented garment in accordance with the present invention may be especially important, for example, to a wearer undergoing short-term physical exertion, such as aerobic activities like running, biking, hiking, other exercise, and/or physical labor. When a person exerts physically, the normal physiological response is to cool down the body by releasing moisture from the body in the form of perspiration. This physiological response still occurs in cold weather, especially when a person wears heat insulating garments. Therefore, one of the objects of the present invention is to provide a cold weather insulating garment that may protect a wearer from extreme, external environmental conditions while still allowing for moisture from perspiration to escape to the outer environment.

Conventional cold weather garments and cold weather garments in accordance with the present invention may be constructed using fabrics treated with down proofing chemical treatments, and/or water repellants that may also act as down proofing treatments, such chemical treatments referred to as DWR (durable water repellant.) Although DWR is a waterproofing chemical treatment, in addition to waterproofing the fabric, it is also very useful for down proofing fabrics, especially light and ultra-light weight fabrics. For example, fabrics that may particularly benefit from DWR treatment for down proofing are light fabrics (89 g/m$^2$-30 g/m$^2$), and ultra-light fabrics (29 g/m$^2$ or lighter). Down can have very sharp shafts that can poke holes through light weight fabrics, making them more susceptible to tearing or down loss over time. Other types of fill material, such as polyester fibers may lack the sharp shafts of down but are still challenging to contain with a light weight textile. Heavier fabrics, such as fabrics with weights in the range of 90 g/m$^2$-149 g/m$^2$, or even 150 g/m$^2$-250 g/m$^2$ or higher may be inherently more resistant to down and may or may not need a down proofing treatment depending on the specific type of fabric/textile, but such fabrics may be used in garments in accordance with the present invention. Lighter weight fabrics may be more desirable in the manufacture of insulation garments in order to keep the garments reasonably light weight, especially in the manufacture of athletic and/or high aerobic activity insulating garments.

The insulating garment in accordance with the present invention may be manufactured from a light weight fabric and may comprise a number of insulating, down or synthetic fiber filled chambers, separated by seams. Seams separating chambers may be spaced at varying intervals and may have any orientation and/or shape. The seams may be formed by actively adhering two layers of fabric together with a suitable adhesive tape material, by stitching two layers of fabric together, or both using the adhesive tape and stitching. In the case of certain fabrics, a tape may not be needed if the fabrics can be bonded without the use of tape. After the seams are formed, the seams may then be perforated with a laser cutter, an ultrasonic cutting wheel. Given the right equipment, the bonding and perforating steps may be performed simultaneously, for example by using a welding and cutting wheel. The plurality of perforations are located on the seams and are cut through the seams. The plurality of perforations may be of different shapes and sizes and may create different patterns. The plurality of perforations may be continuous along the seams, or may be intermittently placed along the seams, or alternatively, the plurality perforations may be placed strategically only on the seams that are located close to areas where perspiration may be particularly high, such as along the back of a wearer or under the arms of a wearer. The size and frequency of the plurality of perforations may be optimized to allow a desired level of ventilation, while still maintaining heat insulation close to the body of the wearer.

In one example of the garment in accordance with the present invention, the garment may be a standalone garment. The garment may be in the form of a vest covering a person's body core area, a jacket with sleeves, a total body suit, etc., when in an as-worn configuration.

Alternatively, the garment in accordance with the present invention may be used as a removable inner insulating layer having an outer shell which may or may not be weather proof. This inner insulating layer may also be worn as a standalone garment when detached from the outer shell. Like in the previous example, the removable inner insulating layer may be presented as a vest, a jacket, a body suit, etc., depending on the type of garment and protection desired. For example, if the outer shell is a long sleeved jacket, the insulating layer may be presented as a vest, a jacket, or a jacket with removable sleeves to convert into a vest, depending on the amount of insulation desired. The insulating layer may be fastened to the outer shell by a zipper mechanism, buttons, hook and loop fasteners, or any other fastening mechanism available in the market, and/or any combination of fastening mechanisms available.

Further, the garment in accordance with the present invention may be engineered into an outer shell. In other words, instead of being removable, an insulating and breathable garment in accordance with the present invention may be permanently attached to the outer shell. This may be achieved by stitching the outer shell to the inner insulating and breathable layer at garment forming seams, meaning the seams located at the top of the shoulders, and/or the side seams running from under the arm socket of a wearer along the length of the garment to the bottom end of the garment. Alternatively, an insulating and breathable layer may be integrated into an outer shell layer by forming the shell from the same textile as one or both of the textiles that form the chambers, by knitting or weaving the shell to the inner layer, using adhesive, etc.

Additional objects, advantages, and novel features of the invention will be set forth in part in the description which follows, and in part will become apparent to those skilled in the art upon examination of the following, or may be learned by practice of the invention.

BRIEF DESCRIPTION OF THE SEVERAL VIEWS OF THE DRAWING

The present invention is described in detail below with reference to the attached drawing figures, wherein.

DETAILED DESCRIPTION OF THE INVENTION

Figure 1A:
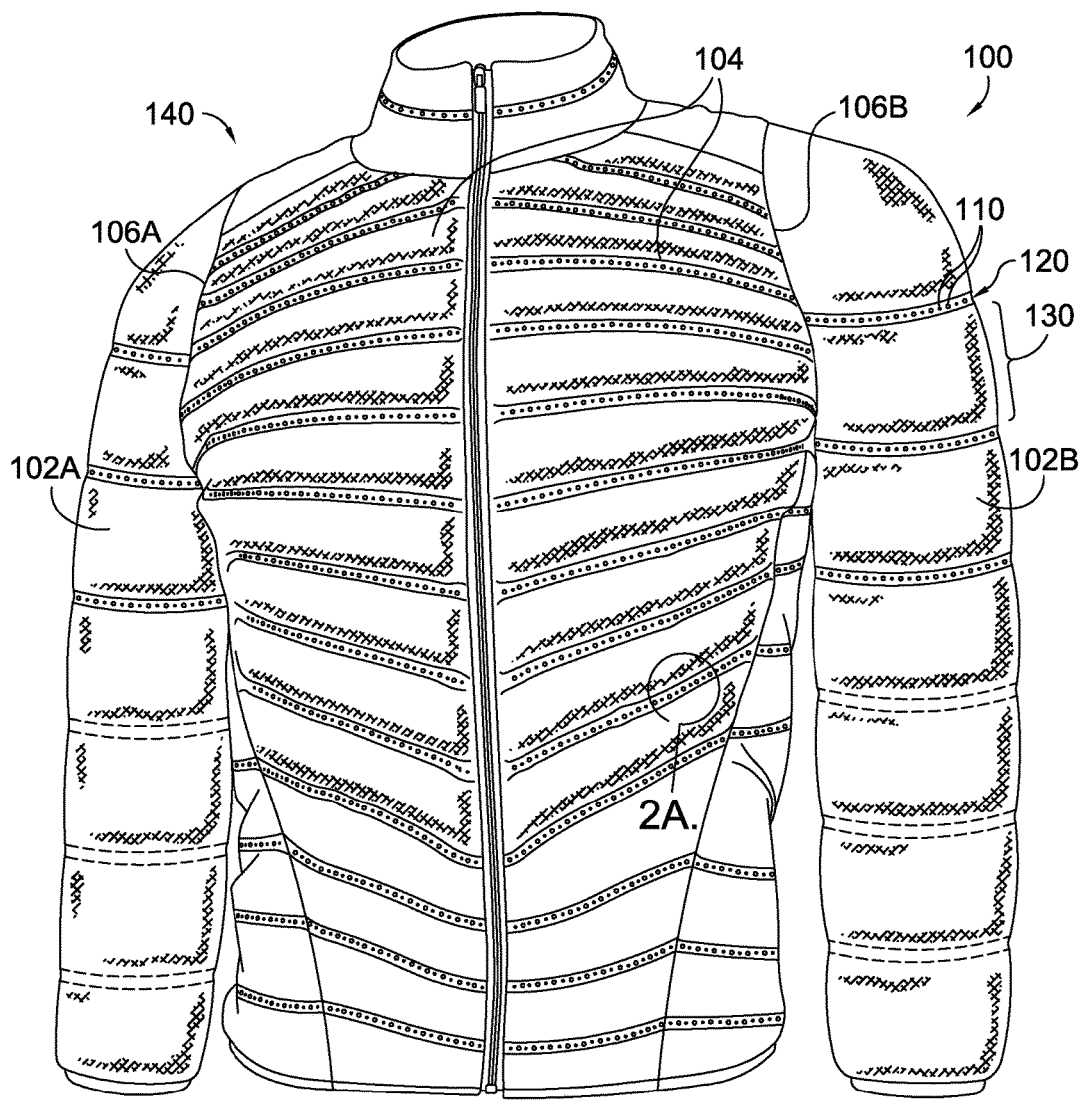
FIGS. 1A and 1B are a front and back view, respectively, of an exemplary cold weather vented garment in accordance with the present invention.
Figure 1B:
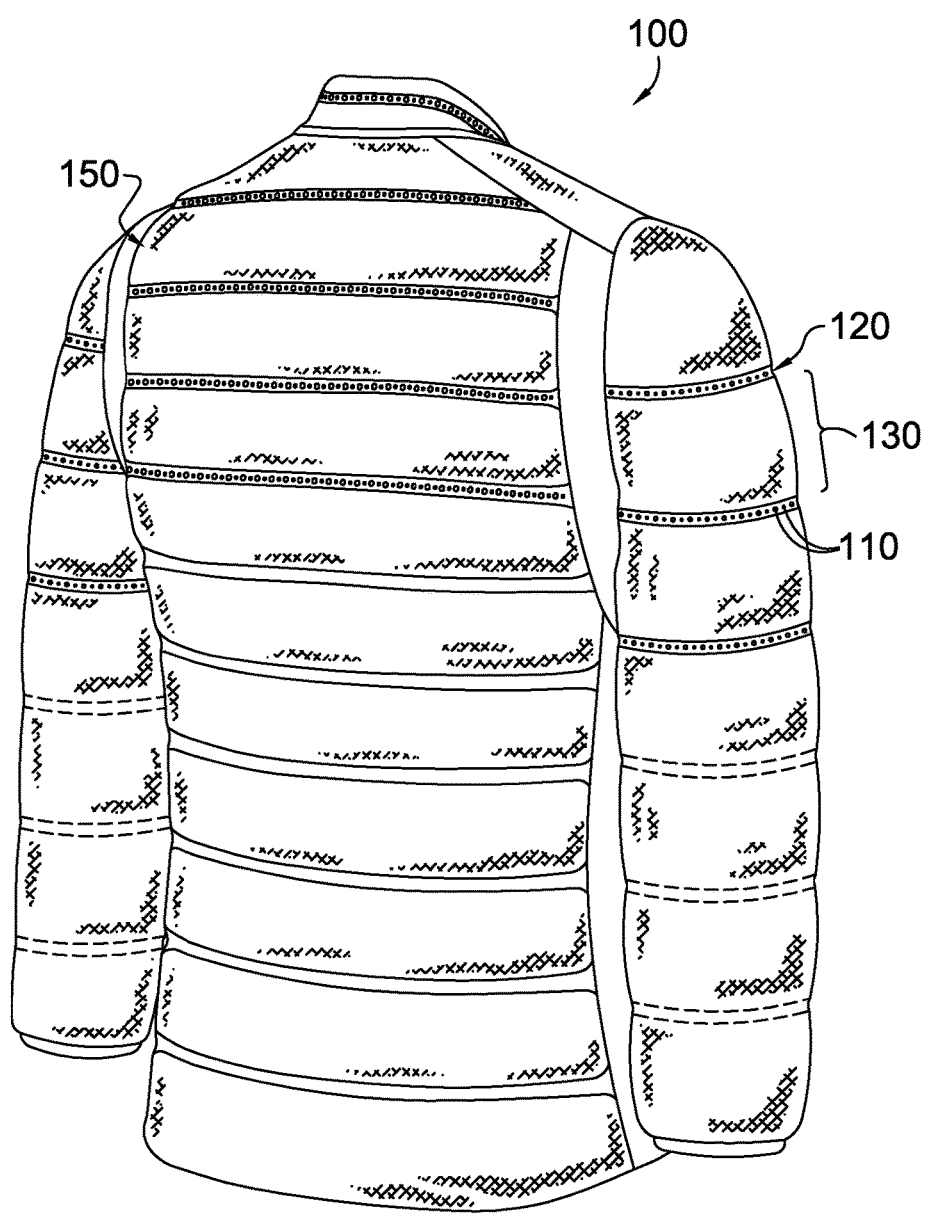

FIGS. 1A and 1B are a front view 140 and a back view 150 of a vented cold weather garment 100 in accordance with the present invention. The vented cold weather garment 100 in FIGS. 1A and 1B may be made from conventional synthetic or natural fabrics. The fabrics may be water repellent and fill proof, or alternatively such as in the case of light fabrics, they may need to be treated with waterproofing and down proofing chemicals such as for example, the chemical treatments referred to as DWR (durable water repellent). Since cold weather garments may be down or synthetic thermal fiber filled, an upside of these treatments, is that they prevent the fill from poking through the fabric and, they prevent water moisture from the environment from entering inside of the garment. A downside of these chemical treatments on fabrics, is that these treatments may create a barrier preventing moisture generated from perspiration to evaporate when the vented cold weather garment is in an as-worn configuration.

The vented cold weather garment in FIGS. 1A and 1B may be constructed by cutting out a first inner layer and a corresponding second outer layer, for each section of the vented cold weather garment 100, such as, for example, one or more front panels 104, one or more back panels 152, and optionally a pair of sleeve panels 102A and 102B, from a fabric piece(s) (not shown). The pair of sleeve panels 102A and 102B, when provided, may be attached to armhole edges 106A and 106B that define armhole openings (not shown) when, for example, the one or more front panels 104 and the one or more back panels 152 are attached to each other to form the garment 100, as shown. An adhesive tape suitable for the particular type of fabric may be placed on the inner face of one of the layers along predetermined sections of the layer to form chambers with the desired shape. Once the adhesive tape is set in place, the layer without the adhesive may be aligned on top of the layer with the adhesive tape with its inner face facing the tape. Then, the two layers may be pressed together with sufficient force and/or energy applied, to activate the adhesive tape to create a bond(s) between the two layers. The adhesive tape may be activated by heat, or ultrasonic energy, or any other type of applied energy. Once the fabrics are bonded, seams 120 with chambers 130 in between each adhesive taped region are created. The seams 120 may be spaced apart along the length of the garment (as shown), or seams 120 may be spaced apart lengthwise, perpendicular to the length of the garment, along the width of the garment (not shown). The spacing of seams 120 may vary, as may the relative orientation of the seams and/or the shape of the seams, enabling chambers 130 to be different shapes and/or sizes. The chambers 130 may then be filled with down, or synthetic insulating fabrics. Depending on the size and/or shape of the chambers formed, the chambers may be filled with down or thermal insulating fibers, either manually or mechanically. Further, manual filling may be the preferred method if the chambers 130 are relatively small or irregularly shaped. Seams 120 may be perforated during bonding, after bonding, and/or after filling the chambers. Perforations 110 may be formed using a laser, an ultrasonic cutter, and/or a mechanical cutter. Provided the proper equipment, the seams 120 may be simultaneously formed and perforated in a single step, although the seams and perforations may be formed in separate steps without departing from the scope of the present invention. The plurality of perforations 110 may provide ventilation and moisture management by allowing moisture vapor from perspiration to escape to the outer environment. As briefly described above, the plurality of perforations 110 may be continuous along the seams 120, or may be intermittently placed along the seams 120, or alternatively, the plurality perforations 110 may be placed strategically only on the seams 120 that are located close to areas of a wearer's body where perspiration may be particularly high, such as along the back of a wearer or under the arms of a wearer. For example, a superior back portion of the wearer's back, that is proximate to the wearer's neck, may be subject to higher perspiration than an inferior back portion of the wearer's back that is proximate to the wearer's waist. Thus, as shown in FIG. 1B, the back panel 152 of the vented cold weather garment 100 may be perforated to form perforations 110 along one or more seams 120 in a superior portion 154 of the back panel 152 aligning with the superior back portion of the wearer when the vented cold weather garment 100 is worn by the wearer, and the one or more seams 120 in an inferior portion 156 of the back panel 152 aligning with the inferior back portion of the wearer when the garment is worn by the wearer, may not be perforated.

In a different example of the garment in accordance with the present invention, depending on the fabric material used, the seams 120 may be created without the use of an adhesive tape. For example if the fabric already has adhesive properties, or is weldable by heat, pressure, or ultrasonic energy, the seams 120 may be created and perforated without the use of adhesive tape.

Figure 2A:
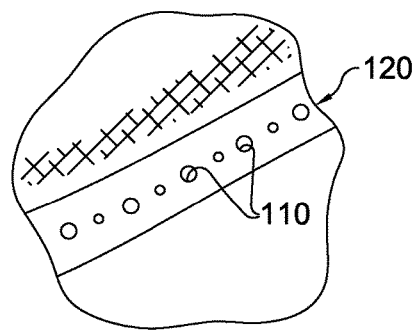
FIG. 2A is a close up view of a section of a venting seam from the cold weather vented garment in FIG. 1A.

FIG. 2A is a close up of a seam 120. The seams 120 formed as described above, may be presented in a straight line (as shown), in a curved line, in a wavy line, or any other shape that may be useful, for example in forming a chamber, and being visually appealing at the same time. The seams 120 may be mechanically perforated by using a welding and cutting wheel assembly, or may be perforated with a laser, an ultrasonic cutter, and/or a mechanical cutter to form the plurality of perforations 110. The plurality of perforations 110 may be of the same size, or different sizes (as shown). The plurality of perforations maybe of different shapes such as circular (as shown), triangular, rectangular, or any other shape desired. The plurality of perforations 110 may be evenly spaced in a straight line, curvy line, zig-zag, or any other suitable shape for placing the plurality of perforations 110 on seams 120, where the plurality of perforations 110 extend through the seams 120. Additionally, depending on the size of the individual perforations, there may be multiple rows of perforations on each seam. The plurality of perforations 110 may be presented continuously along the seams 120 (as shown), or may be presented intermittently along seams 120, or may be strategically placed only in the areas of high perspiration such as along the back of a wearer, under the arms of a wearer, between the legs of a wearer, etc. The size and frequency of the individual perforations 110 may be determined to provide optimal ventilation and breathability, while still maintaining the structural integrity of the fabric, and maintaining a high level of thermal insulation. For example, the width size of each individual perforation in the plurality of perforations 110 may range anywhere from 0.1 mm-5 mm, and the spacing between each individual perforation measured from edge to edge, may range anywhere from 0.5 mm-10 mm. Other sizes and/or spacing of perforations may be used without departing from the scope of the present invention.

Figure 2B:
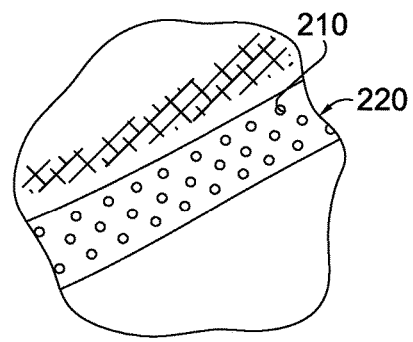
FIG. 2B is a close up view of a section of a different example of a venting seam from a cold weather garment in accordance with the present invention.

FIG. 2B is a close up of a seam 220. The seams 220 formed as described above, may be presented in a straight line (as shown), in a curved line, in a wavy line, or any other shape that may be useful, for example in forming a chamber, and being visually appealing at the same time. The seams 220 may be mechanically perforated by using a welding and cutting wheel assembly, may be perforated with a laser, an ultrasonic cutter, and/or a mechanical cutter, or may be perforated in any other way to form the plurality of perforations 210. The plurality of perforations 210 may be of the same size (as shown), or different sizes. The plurality of perforations maybe of different shapes such as circular (as shown), triangular, rectangular, or any other shape desired. The plurality of perforations 210 may be evenly spaced in a straight line, curvy line, zig-zag, or any other suitable shape for placing the plurality of perforations 210 on seams 220, where the plurality of perforations 210 extend through the seams 220. Additionally, depending on the size of the individual perforations, there may be multiple rows of perforations on each seam. For example, as seen in FIG. 2B, there may be three rows of perforations 210, wherein the perforations 210 of the middle row may or may not be offset from the perforations of the first and third rows. In the case where the perforations 210 of the middle row are offset (as shown), the offset distance may range anywhere from 0 mm-10 mm, or any other distance suitable for the performance and design desired in the final product. While in the present example, only the middle row is offset, all or none of the rows may be offset or, if more rows of perforations are present, different rows may be chosen to be offset. The plurality of perforations 210 may be presented continuously along the seams 220 (as shown), or may be presented intermittently along seams 220, or may be strategically placed only in the areas of high perspiration such as along the back of a wearer, under the arms of a wearer, between the legs of a wearer, etc. The size and frequency of the individual perforations 210 may be determined to provide a desired level of ventilation and breathability, while still maintaining the structural integrity of the fabric and maintaining a desired level of thermal insulation. For example, a desired amount of ventilation, breathability, structural integrity, and thermal insulation may be achieved in a garment using light fabric/textile and down fill with a width size of each individual perforation in the plurality of perforations 210 ranging anywhere from 0.1 mm-5 mm, and the spacing between each individual perforation measured from edge to edge ranging anywhere from 0.5 mm-10 mm, although other sizes and configurations are within the scope of the present invention.

One way of measuring the amount of breathability of a garment, such as garments in accordance with the present invention, may be by performing a hot-plate transfer test, which allows for measurement of the resistance to evaporative transfer of a textile or garment. The lower the resistance number obtained from the test, the less resistance to evaporation there is and therefore, the more evaporation that occurs through the garment in a given amount of time. Garments in accordance with the present invention may be shown to have lower resistance to evaporative transfer than un-perforated garments in hot-plate transfer testing.

Figure 3:
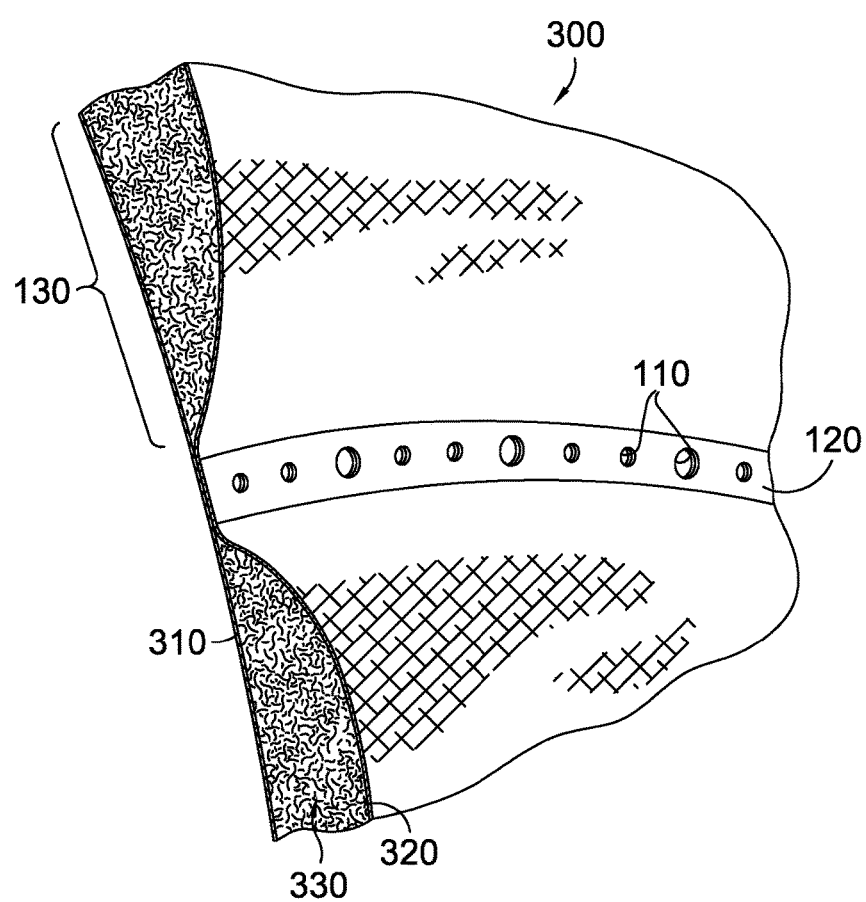
FIG. 3 is a cross-sectional view of a small section of the cold weather vented garment in FIG. 1, where the insulating chambers are shown in relation to the perforated seams.

The garment construction may become more apparent in reference to FIG. 3, where an angled cross-sectional view 300 of a small section of the garment with all the novel features, is shown. The garment in accordance with the present invention may be constructed from a first inner panel 310 and a second outer panel 320. The seams 120 and chambers 130 may be created as described above in reference to FIGS. 1A and 1B, where the chambers 130 are created between pairs of seams 120 between the first inner panel 310 and the first outer panel 320. The plurality of perforations 110 extend through the first inner panel 310 and the second outer panel 320 to provide ventilation and moisture management by allowing moisture vapor from perspiration to escape to the outer environment when the vented cold weather garment is in an as-worn configuration. The chambers 130 may then be filled with a fill 330, such as down or synthetic fibers.

Figure 4:
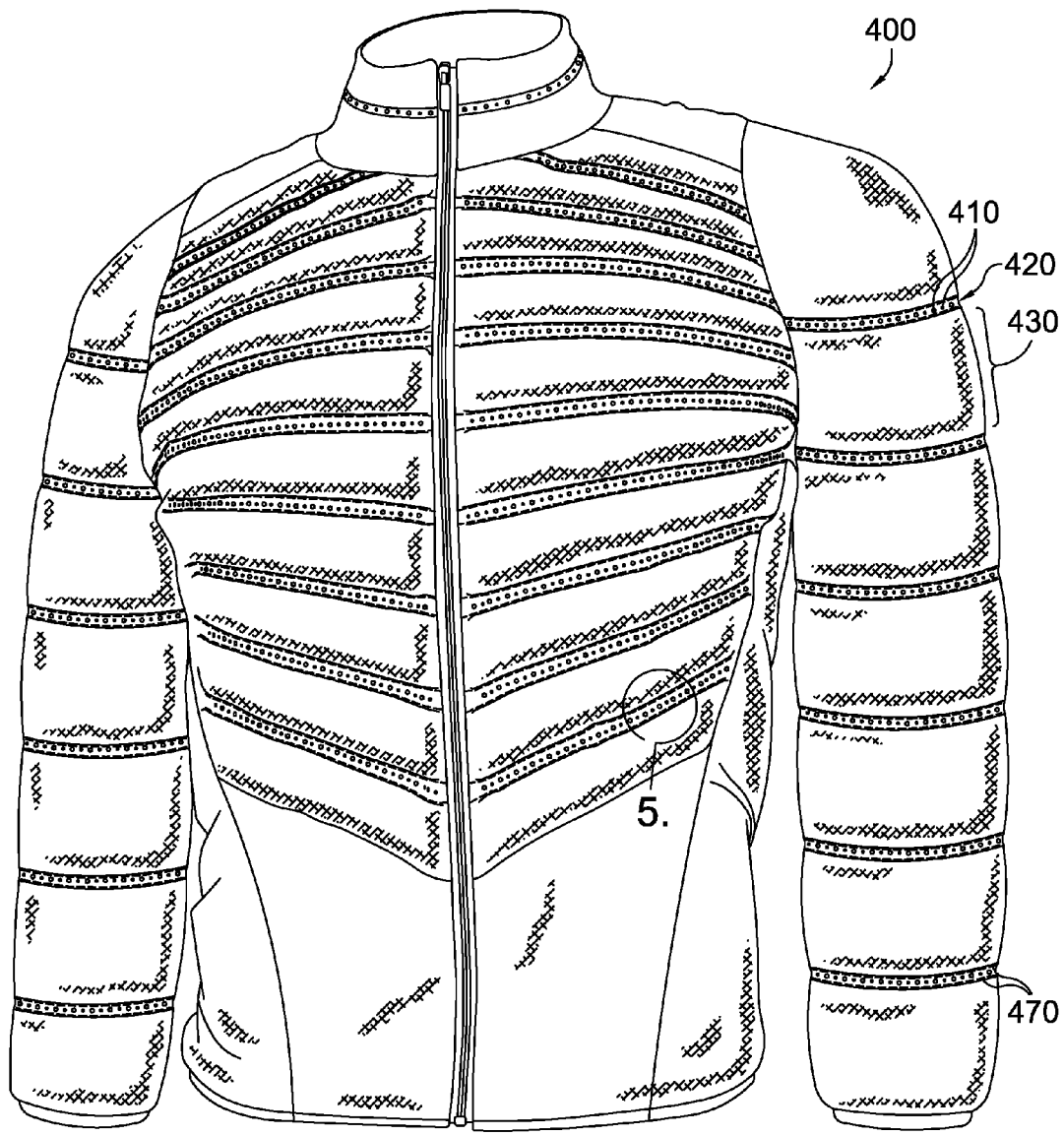
FIG. 4 is a view of a different exemplary cold weather vented garment in accordance with the present invention.

Now, in reference to FIG. 4, a front view of a different cold weather garment 400 in accordance with the present invention is provided. Like the cold weather garment 100 of FIGS. 1A and 1B, the vented cold weather garment 100 in FIG. 4 may be made from conventional synthetic or natural fabrics. The fabrics may be water repellent and down proof, or alternatively such as in the case of ultra-light fabrics (29 g/m² or lower) and light weight fabrics (89 g/m²-30 g/m²), the fabrics may need to be treated with waterproofing and down proofing chemicals such as for example, the chemical treatments referred to as DWR (durable water repellent).

Figure 5:
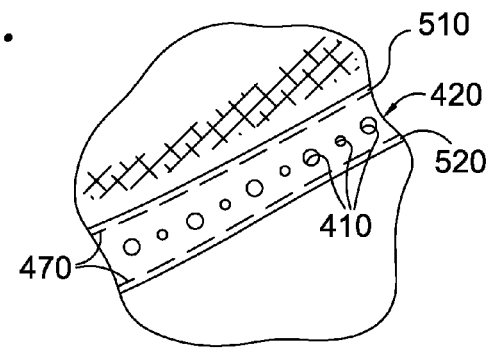
FIG. 5 is a close up view of a section of a venting seam from the cold weather vented garment in FIG. 4.

The cold weather garment in FIG. 4 may be constructed in a fashion similar to that described above with regard to the garment shown in FIGS. 1A and 1B to form seams 420 to create chambers to hold fill material, with a plurality of perforations 410 formed in seams 420. The seams 420 may be further reinforced by adding stitching 470 along their upper edge/boundary 510 and/or lower edge/boundary 520, as can be seen in the close up view of FIG. 5.

Stitching 470 may be applied mechanically and/or by hand, and may use any type of thread, whether natural or synthetic. Stitching 470 may be applied before or after applying pressure and/or energy to form seams 420. Likewise, stitching 470 may be applied before or after perforations 410 and/or before or after chambers 430 are filled.

Figure 6:
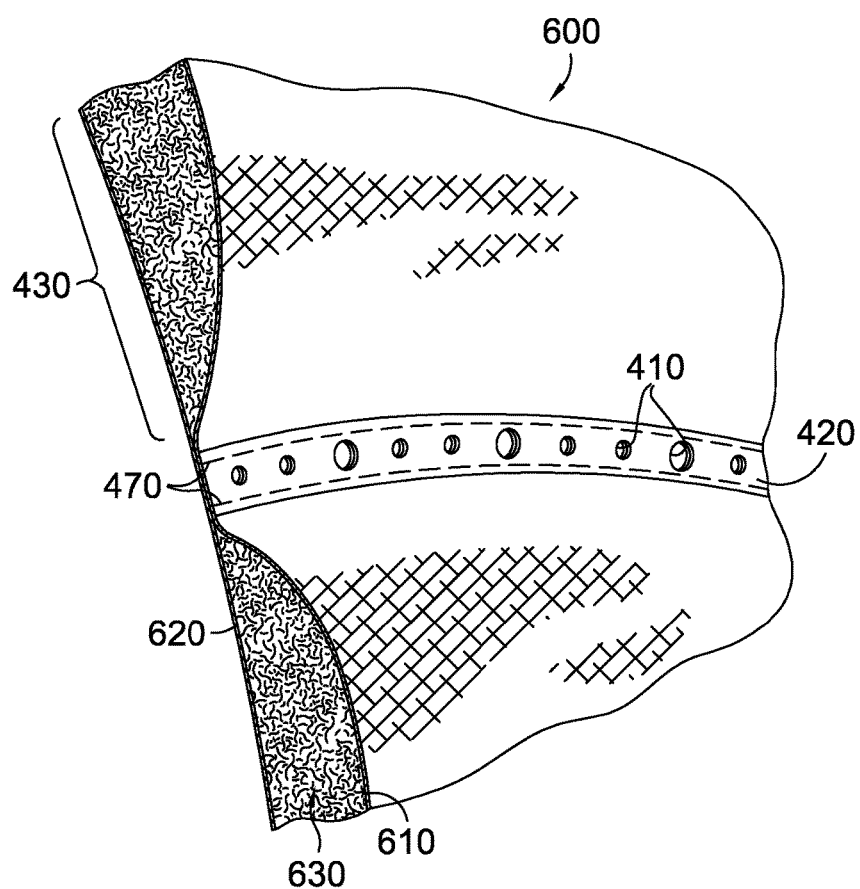
FIG. 6 is a cross-sectional view of a small section of the cold weather vented garment in FIG. 4, where the insulating chambers are shown in relation to the perforated seams.

The garment construction may become more apparent in reference to FIG. 6, where an angled cross-sectional view 600 of a small section of the garment with all the novel features, is shown. The garment in accordance with the present invention may be constructed from a first inner panel 620 and a second outer panel 610. The seams 420 and chambers 430 may be created as described above in reference to FIG. 4. The chambers may then be filled with fill 630, such as down or synthetic fibers.

Alternatively, in a further different example of the garment in accordance with the present invention, the seams 420 may be produced by omitting the adhesive tape layer altogether. In other words, the seams 420 may be created simply by stitching 470 along the upper seam boundary 510 and lower seam boundary 520. The plurality of perforations 410 may then be placed in between the stitched boundaries. This example may be pictured better in reference to FIG. 5.

The insulating chambers in the garments in accordance with the present invention may be formed by welding separate pieces of fabric at each seam, or as discussed earlier, may be formed by pressing two whole panels with adhesive tape in strategic places in between the two panels. If the chambers were formed by welding separate pieces of fabric at each seam, this would allow for the introduction of different textures, colors, or functionalities by introducing different types of fabrics at different sections of the garment.

Figure 7A:
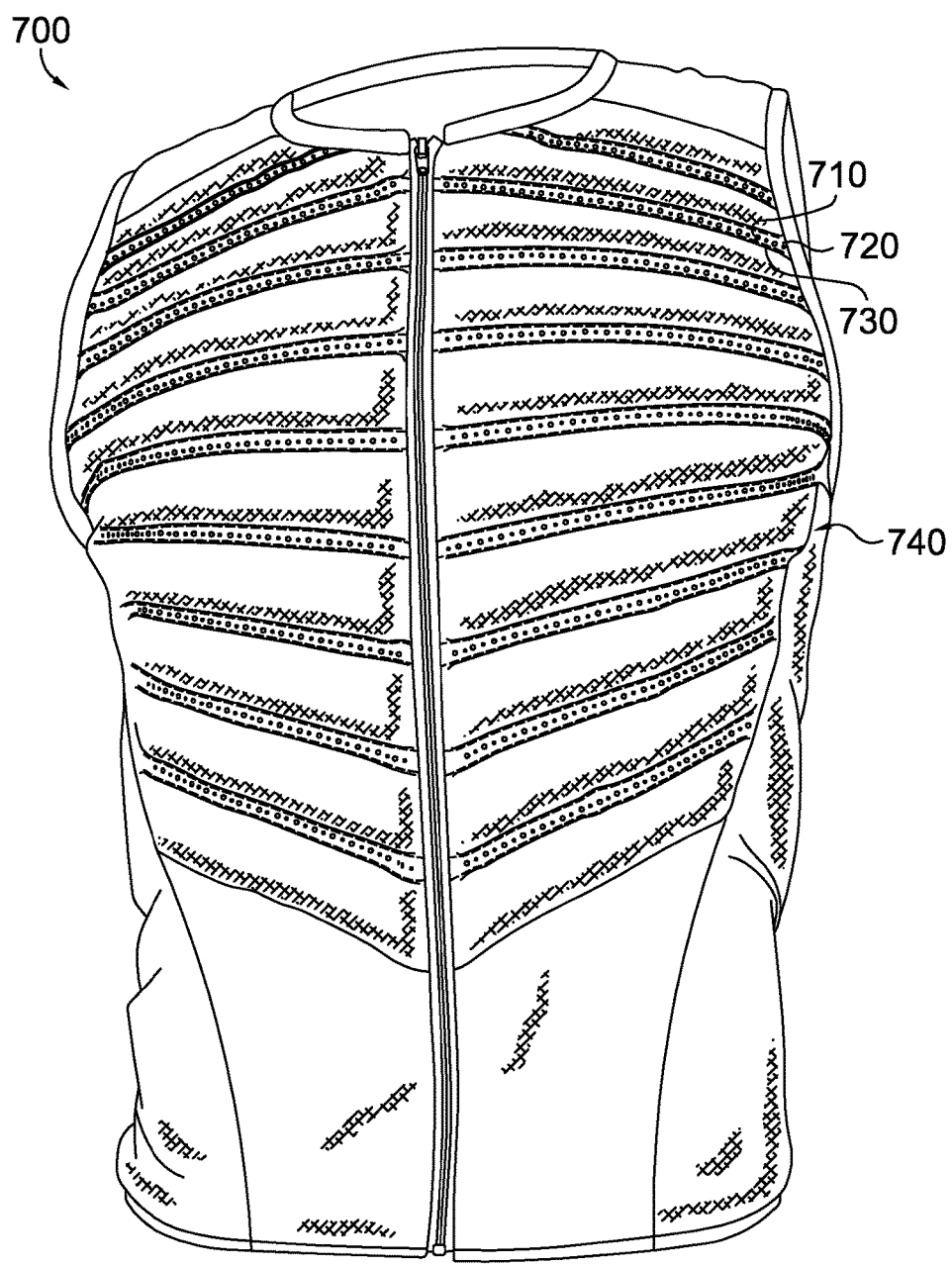
FIGS. 7A and 7B depict front and back view of an additional exemplary cold weather vented garment in accordance with the present invention.
Figure 7B:
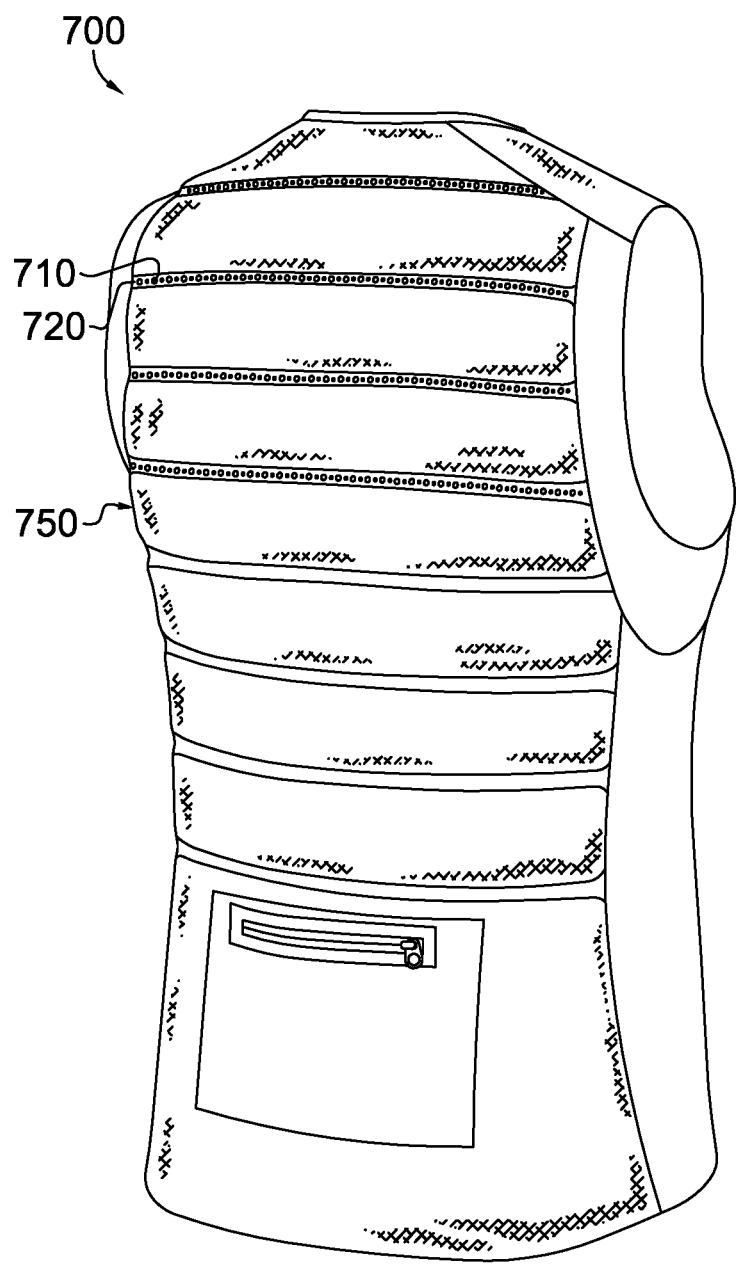

Further, the vented cold weather insulating garment examples shown in the examples of FIGS. 1A, 1B, and FIG. 4 are vented cold weather jackets or coats. However, the insulating vented garments in accordance with the present invention may also be constructed in the form of vests, pants, overalls, gloves, hats, etc. FIGS. 7A and 7B depict an example vest 700 in accordance with the present invention, with FIG. 7A depicting a front view 740 and FIG. 7B depicting a back view 750 of the exemplary vest 700. As seen in FIGS. 7A and 7B, the vest 700 may have seams 720 with a plurality of perforations 710, forming thermally insulating chambers 740, which may be filled with down, or any other thermally insulating material, such as polyester fibers. The vest 700 may or may not have stitches along the edges of seams 720 for reinforcement of the seams. The vest 700 may be used as a light weight breathable thermal insulation garment, for example by a runner.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

The invention claimed is:

1. A method of making a garment comprising:
   aligning a first panel of material with a second panel of material, wherein the first panel of material and the second panel of material are shaped to form a back section of the garment, wherein a superior portion of the back section of the garment is configured to cover an upper portion of a wearer's back that is proximate to a neck of a wearer and wherein an inferior portion of the back section of the garment is configured to cover a lower portion of the wearer's back proximate to a waist of the wearer, when the garment is in an as worn configuration;
   affixing the first panel of material and the second panel of material together at a first plurality of seams located in the superior portion of the back section and a second plurality of seams located in the inferior portion of the back section to form one or more chambers defined by the first panel of material, the second panel of material, and at least one seam in the first plurality of seams located in the superior portion of the back section of the garment, and at least one seam in the second plurality of seams located in the inferior portion of the back section of the garment;
   perforating one or more of the first plurality of seams located in the superior portion of the back section of the garment to create at least one perforation on the one or more of the first plurality of seams located in the superior portion of the back section of the garment, wherein the at least one perforation extends through the one or more of the first plurality of seams, through the first panel of material, and through the second panel of material, and not creating any perforations on the second plurality of seams located in the inferior portion of the back section of the garment;
   filling the one or more chambers with one or more of down and synthetic fibers; and
   using the back section to form the garment.

2. The method of claim 1, wherein the affixing step comprises:
   stitching the first panel of material and the second panel of material together to form the first plurality of seams and the second plurality of seams.

3. The method of claim 1, wherein the affixing step comprises:
   applying an adhesive to an inner face of the first panel of material, and positioning an inner face of the second panel of material such that it is adjacent to the inner face of the first panel of material, to form the first plurality of seams and the second plurality of seams by activating the adhesive; or
   applying the adhesive to the inner face of the second panel of material, and positioning the inner face of the first panel of material such that it is adjacent to the inner face of the second panel of material, to form the first plurality of seams and the second plurality of seams by activating the adhesive.

4. The method of claim 3, wherein the applied adhesive is activated by one of:
 (A) heat energy; or
 (B) ultrasonic energy.

5. The method of claim 3, wherein each seam in the first plurality of seams and each seam in the second plurality of seams is further reinforced by one of:
 (A) adding stitching along a lower edge of the each seam in the first plurality of seams and the each seam in the second plurality of seams, along a length of the each seam in the first plurality of seams and the each seam in the second plurality of seams;
 (B) adding stitching along an upper edge of the each seam in the first plurality of seams and the each seam in the second plurality of seams, along the length of the each seam in the first plurality of seams or the each seam in the second plurality of seams; or
 (C) adding stitching along the upper edge and the lower edge of the each seam in the first plurality of seams and the each seam in the second plurality of seams, along the length of the each seam in the first plurality of seams and the each seam in the second plurality of seams.

* * * * *

UNITED STATES PATENT AND TRADEMARK OFFICE
CERTIFICATE OF CORRECTION

PATENT NO. : 10,362,820 B2
APPLICATION NO. : 15/140214
DATED : July 30, 2019
INVENTOR(S) : Luke A. Pezzimenti, Lindsey V. J. Martin and Irena Ilcheva Page 1 of 1

It is certified that error appears in the above-identified patent and that said Letters Patent is hereby corrected as shown below:

On the Title Page

Page 3, Column 2, Line 37: item (56) In the Other Publications, delete "Mavis" and insert --Mavic--.
Page 3, Column 2, Line 46: item (56) In the Other Publications, delete "/Gatalog/" and insert --/catalog/--.

Signed and Sealed this
First Day of October, 2019

Andrei Iancu
*Director of the United States Patent and Trademark Office*